Morgan & Mosher,
Hot Corn Holder.
No. 94,330. Patented Aug. 31. 1869.
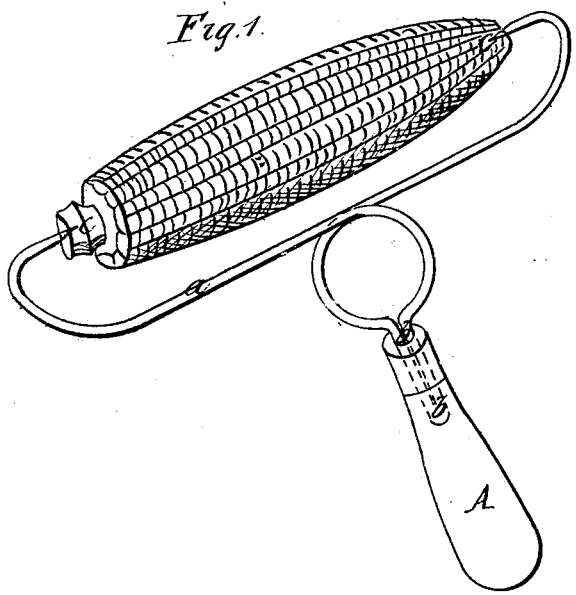
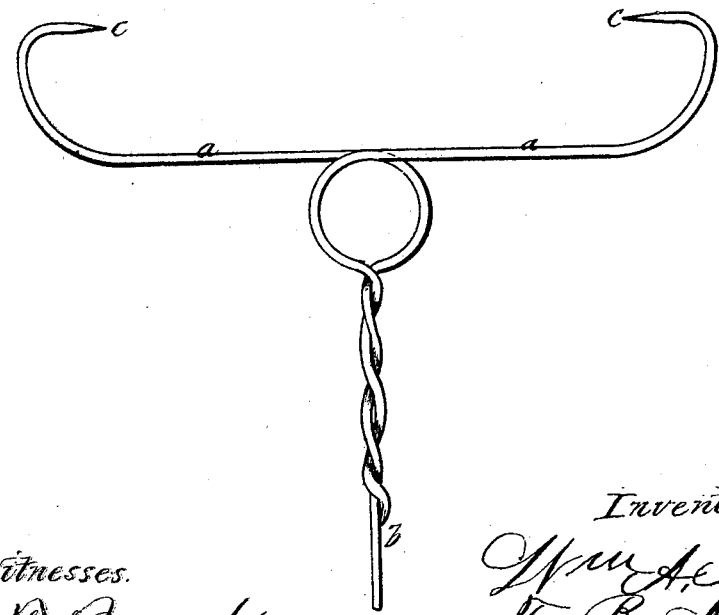
Witnesses.
Jno. E. Brooks
Geo. W. Mabee
Inventor:
Wm. A. Morgan
T. B. Mosher
Munn & Co

United States Patent Office.

WILLIAM A. MORGAN, OF BROOKLYN, AND TOMPSON B. MOSHER, OF NEW YORK, N. Y.

Letters Patent No. 94,330, dated August 31, 1869.

IMPROVED HOT-CORN HOLDER.

The Schedule referred to in these Letters Patent and making part of the same.

*To all whom it may concern:*

Be it known that we, WILLIAM A. MORGAN, of the city of Brooklyn, Kings county, and TOMPSON B. MOSHER, of the city, county, and State of New York, have invented a new and improved Implement for Holding Ears of Corn; and we do hereby declare that the following is a full, clear, and exact description thereof, which will enable others skilled in the art to make and use the same, reference being had to the accompanying drawings, forming part of this specification.

The object of this invention is to provide a device, by which boiled ears of corn can be conveniently held to the mouth, and so as not to soil the hands.

The invention consists in the construction of a spring-clamp, having two pointed jaws and a shank, the jaws having sufficient spring to cause them to fit and hold ears of corn of different lengths. The spring is also sufficient to prevent the ear of corn from turning loose on the jaws.

In the drawing—

Figure 1 represents a perspective view of our improved corn-holder, showing it provided with a handle.

Figure 2 is a side view of the same, showing it with a shank long enough to dispense with a handle.

Similar letters of reference indicate corresponding parts.

The whole implement is, or may be made of a single piece of wire, so bent as to form two curved arms, $a\ a$, which project from two sides of a shank, $b$. At the shank the wire is doubled, and at its upper end coiled, to form a spring, by which the arms are thrown toward each other.

The arms have inwardly-bent pointed ends, $c\ c$, which are in line, as shown, and which serve to retain the ear of corn by being fitted into the ends of the same.

The ear of corn is put on by springing the arms apart, and bringing the points $c\ c$ in line with the ends of the ear of corn.

The arms are then released, and will force the ends into the ear of corn, as shown, and retain the same.

The ear of corn can then be held to the mouth, and can be turned when desired.

The spring pressure against its ends is strong enough to prevent it from turning spontaneously.

The shank may be made long enough to serve as a handle, as in fig. 2, or it may be put into a separate suitable handle, A, as in fig. 1.

Having thus described our invention,

What we claim as new, and desire to secure by Letters Patent, is—

A spring holder for corn-ears, made of one continuous wire, substantially as herein shown and described.

WM. A. MORGAN.
TOMPSON B. MOSHER.

Witnesses:
GEO. W. MABEE,
WM. F. CLARK.